(12) United States Patent
Nilsson et al.

(10) Patent No.: US 10,037,036 B2
(45) Date of Patent: Jul. 31, 2018

(54) METHOD AND ARRANGEMENT FOR DETERMINING SAFE VEHICLE TRAJECTORIES

(71) Applicant: VOLVO CAR CORPORATION, Gothenburg (SE)

(72) Inventors: Jonas Nilsson, MoIndal (SE); Mattias Erik Brannstrom, Gothenburg (SE); Mohammad Ali, Angered (SE); Joakim Lin Sorstedt, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 15/139,554

(22) Filed: Apr. 27, 2016

(65) Prior Publication Data

US 2016/0327953 A1    Nov. 10, 2016

(30) Foreign Application Priority Data

May 5, 2015  (EP) .................................... 15166327

(51) Int. Cl.
*G01C 22/00*    (2006.01)
*G05D 1/00*    (2006.01)
(Continued)

(52) U.S. Cl.
CPC ....... *G05D 1/0214* (2013.01); *B60W 50/0097* (2013.01); *G01S 13/931* (2013.01);
(Continued)

(58) Field of Classification Search
USPC .......................................................... 701/25
See application file for complete search history.

(56) References Cited

U.S. PATENT DOCUMENTS 8,060,307 B2    11/2011    Matsuno
8,190,295 B1 *    5/2012    Garretson ............ G05D 1/0038
700/245

(Continued)

FOREIGN PATENT DOCUMENTS

DE    102008003950    7/2008
DE    102007013023    9/2008
(Continued)

OTHER PUBLICATIONS

Extended European Search Report for EUropean Application No. EP 15166327.5, Completed by the European Patent Office, dated Nov. 6, 2015, 8 Pages.

*Primary Examiner* — Jean Paul Cass
(74) *Attorney, Agent, or Firm* — Brooks Kushman P.C.

(57) ABSTRACT

A method and arrangement for determining safe vehicle trajectories for a vehicle equipped with sensors for monitoring a surrounding environment, taking into account sensing limitations, as well as a vehicle including such an arrangement. The method includes detecting observable obstacles, detecting unobservable areas, adding virtual obstacles in unobservable areas, associating each observable obstacle and each virtual obstacle with one or more hypothetical events and assigning an occurrence probability to each combination of obstacle and one or more events, and determining safe vehicle trajectories based on both observable obstacles and virtual obstacles and the occurrence probability of each combination of obstacle and one or more events.

15 Claims, 5 Drawing Sheets

(51) Int. Cl.
*G05D 1/02* (2006.01)
*B60W 50/00* (2006.01)
*G01S 13/93* (2006.01)
*G08G 1/16* (2006.01)

(52) U.S. Cl.
CPC .......... *G05D 1/0088* (2013.01); *G08G 1/16* (2013.01); *G01S 2013/9332* (2013.01); *G01S 2013/9353* (2013.01); *G01S 2013/9357* (2013.01); *G01S 2013/9364* (2013.01); *G01S 2013/9367* (2013.01); *G01S 2013/9375* (2013.01); *G05D 2201/0212* (2013.01)

(56) References Cited

U.S. PATENT DOCUMENTS

| | | | | |
|---|---|---|---|---|
| 8,401,242 | B2* | 3/2013 | Newcombe | A63F 13/06 382/107 |
| 8,803,952 | B2* | 8/2014 | Katz | A63F 13/06 348/47 |
| 8,864,497 | B1* | 10/2014 | Pollak | G09B 9/08 434/37 |
| 9,561,796 | B2* | 2/2017 | Mielenz | B60W 30/143 |
| 2008/0027591 | A1* | 1/2008 | Lenser | G05D 1/0251 701/2 |
| 2011/0125419 | A1* | 5/2011 | Bechhoefer | F03D 7/047 702/34 |
| 2012/0306850 | A1* | 12/2012 | Balan | G06T 19/006 345/419 |
| 2014/0195138 | A1* | 7/2014 | Stelzig | G08G 1/0116 701/119 |
| 2015/0066329 | A1 | 3/2015 | Mielenz | |
| 2015/0097864 | A1* | 4/2015 | Alaniz | G06T 19/006 345/633 |
| 2015/0100179 | A1* | 4/2015 | Alaniz | A63F 13/00 701/1 |
| 2016/0003636 | A1* | 1/2016 | Ng-Thow-Hing | H04N 7/188 701/26 |
| 2016/0082597 | A1* | 3/2016 | Gorshechnikov | G06N 5/02 700/253 |
| 2016/0368505 | A1* | 12/2016 | Sorstedt | B60W 30/12 |
| 2017/0096242 | A1* | 4/2017 | Alfano | B64G 3/00 |

FOREIGN PATENT DOCUMENTS

| | | |
|---|---|---|
| DE | 102013203239 | 8/2014 |
| EP | 1990787 | 11/2008 |

* cited by examiner

METHOD AND ARRANGEMENT FOR DETERMINING SAFE VEHICLE TRAJECTORIES

CROSS-REFERENCE TO RELATED APPLICATIONS

This application claims foreign priority benefits under 35 U.S.C. § 119(a)-(d) to European patent application number EP 15166327.5, filed May 5, 2015, which is incorporated by reference in its entirety.

TECHNICAL FIELD

Embodiments herein relate to a method and arrangement for determining safe vehicle trajectories for a vehicle equipped with sensors for monitoring the surrounding environment, taking into account sensing limitations, as well as a vehicle that comprises such an arrangement.

BACKGROUND

Motor vehicles are increasingly being equipped with sensors which monitor the surrounding environment. This sensor information may be used to more or less automatically control a future trajectory of the vehicle. This automation may range from a fully autonomous vehicle to a driver controlled vehicle where the sensor information is only used to inform the driver. In all levels of automation there is a need for safe driving, meaning in this case to plan and realize a vehicle trajectory with an acceptably low level of risk.

In a case where the automated function takes responsibility for a particular driving task, the automation system should be able to operate with a sufficiently low level of risk. This is the purpose of functional safety. This is challenging when the automation system uses sensors which have inherent limitations, e.g. cannot detect everything in the environment of the vehicle. This is why most automated functions rely on the fact that the driver of the vehicle is always responsible for safe operation of the vehicle and that the driver of the vehicle at any moment may regain control of the vehicle.

One such example is provided by document EP1990787 A1, which relates to properly dealing with a blocked area for which obstacle detection by an in-vehicle sensor cannot be performed. When there is a blocked area, for which a sensor mounted on an own vehicle cannot perform detection, in movable areas of the own vehicle, it is assumed that an obstacle can be present in the blocked area. When an obstacle can be present in the blocked area, unconfirmed bodies are arranged virtually in the blocked area as obstacle candidates. Thus, environmental prediction can be performed with the use of the obstacle candidates represented by the unconfirmed bodies. The behavior of an unconfirmed, virtual, moving body may be predicted, whereby an automobile model may be used for the prediction of a behavior of an automobile and a human model for the prediction of a behavior of a human, and further a single-moving-body model such as a two-wheeled motor vehicle model and a bicycle model as necessary. A predicting unit can predict a possibility of collision and the like of the own vehicle during driving by predicting a possible track based on the behaviors of the unconfirmed bodies that are arranged eventually in the movable areas of the own vehicle, and the behavior of the own vehicle (such as a speed and a steering direction), for example. In particular, even when there is the blocked area in the movable area, and detection by the sensor mounted on the own vehicle cannot be performed on the blocked area, it is assumed that there might be an obstacle in the blocked area, and when there can be an obstacle in the blocked area, the unconfirmed bodies are arranged virtually as the obstacle candidates in the blocked area. The obstacle detecting method, the obstacle detecting apparatus, and the standard moving-body model according to EP1990787 A1 are said to be useful for collision avoidance, collision warning, and the like of automobiles, and particularly suitable for automatic driving of automobiles.

According to document EP1990787 A1, unconfirmed moveable candidate objects are placed at all positions in all blocked areas where it is possible that a moveable object might exist. These candidate objects are later replaced by observed real objects once the area has been observed, alternatively the candidate objects are removed once the area has been observed. Candidate objects may e.g. be represented by pedestrians or vehicles. Replacing the candidate objects with real observed objects is said to enable use of improved prediction models for the observed objects as compared to the virtual candidate objects.

However, although document EP1990787 A1 relates to an obstacle detection method, it nowhere mentions how an associated vehicle should respond to the candidate objects. Thus, there is still room for improvement in the above field.

SUMMARY

Embodiments herein aim to provide an improved method for determining safe vehicle trajectories for a vehicle equipped with sensors for monitoring the surrounding environment, taking into account sensing limitations, enabling the vehicle to drive with precaution, where precaution is a measure taken in advance in order to prevent something dangerous, unpleasant or inconvenient from happening.

This is provided through a method that comprises the steps of: detecting observable obstacles; detecting unobservable areas; adding virtual obstacles in unobservable areas; associating each observable obstacle and each virtual obstacle with one or more hypothetical events and assigning an occurrence probability to each combination of obstacle and events; and determining safe vehicle trajectories based on both observable obstacles and virtual obstacles and the occurrence probability of each combination of obstacle and events.

The provision of safe vehicle trajectories based on both observable obstacles and virtual obstacles, associated hypothetical events and occurrence probabilities of each combination of obstacles and events, as above, provides for allowing vehicles to travel safely with precaution in environments where not all objects have already been observed.

According to a second embodiment, unobservable areas are determined as at least one of: areas outside a sensing range of the vehicle sensors; areas for which the confidence of obtained sensor readings fall below a predetermined confidence threshold; and areas occluded by objects in the vehicle surrounding environment.

The provision of determining unobservable areas, as above, provides some efficient alternatives for this determination.

According to a third embodiment, virtual obstacles, the associated hypothetical events of which exceed a predetermined probability to occur, are added to the unobservable areas.

The provision of adding virtual obstacles, the associated hypothetical events of which exceed a predetermined probability to occur reduces the number of virtual obstacles to be added.

According to a fourth embodiment, safe vehicle trajectories are determined such that, should a low-probability hypothetical event occur, a first margin is applied, and such that, should a high-probability hypothetical event occur, a second margin is applied, where the first margin is relatively smaller than the second margin.

The provision of using a first margin for low-probability hypothetical events and using a second margin for high-probability hypothetical events provides for efficient determination and adaptation of safe vehicle trajectories.

According to a fifth embodiment, an environment category is determined from a set of predetermined environment categories and the one or more hypothetical events selected from a set of predetermined hypothetical events based on the determined environment category, and virtual obstacles having different associated hypothetical events are assigned different probabilities to occur depending on the determined environment category.

The provision of selecting hypothetical events from predetermined hypothetical events based on a determined environment category and assigning virtual obstacles having different associated hypothetical events different probabilities to occur depending on the determined environment category provide for efficiently adapting to a current vehicle environment.

According to a sixth embodiment, statistic data for previous occurrences of observed obstacles associated with predetermined environment categories is relied on for determining probabilities for virtual obstacles to occur depending on the determined environment category.

The provision of using statistic data for determining probabilities for previous occurrences of observed obstacles associated with predetermined environment categories for determining probabilities for virtual obstacles to occur depending on the determined environment category provides for still further enhancing the safe vehicle trajectories in dependence of the current vehicle environment.

According to a seventh embodiment, the first and second margins are either physical margins to an obstacle or margins in terms of vehicle dynamics.

The provision of the first and second margins being either physical margins to an obstacle or margins in terms of vehicle dynamics provides for further enhancing the safe vehicle trajectories.

According to an eighth embodiment, physical margins to an obstacle are distances from a safe vehicle trajectory to the obstacle, and margins in terms of vehicle dynamics are margins in one or more of vehicle longitudinal-, lateral- and yaw-acceleration levels required for following a safe vehicle trajectory.

The provision of physical margins to an obstacle being distances from a safe vehicle trajectory to the obstacle, and margins in terms of vehicle dynamics being margins in one or more of vehicle longitudinal-, lateral- and yaw-acceleration levels provides alternatives for providing margins to the safe vehicle trajectories.

According to a ninth embodiment, an increased physical margin to an obstacle means an increased distance from a safe vehicle trajectory to the obstacle and a decreased physical margin to an obstacle mean a reduced distance from a safe vehicle trajectory to the obstacle, and an increased margin in terms of vehicle dynamics means reduced vehicle acceleration levels required for following a safe vehicle trajectory and a decreased margin in terms of vehicle dynamics means increased vehicle acceleration levels required for following a safe vehicle trajectory.

The provision of the above definition of increased and decreased margins provides for adapting the margins of the safe vehicle trajectories.

According to a tenth embodiment, an arrangement for determining safe vehicle trajectories for a vehicle equipped with sensors for monitoring the surrounding environment, taking into account sensing limitations, that comprises: a processor arranged to process readings from the vehicle sensors for monitoring the surrounding environment; and detect observable obstacles; detect unobservable areas; add virtual obstacles in unobservable areas; associate each observable obstacle and each virtual obstacle with one or more hypothetical events and assign an occurrence probability to each combination of obstacle and events; and determine safe vehicle trajectories based on both observable obstacles and virtual obstacles and the occurrence probability of each combination of obstacle and events.

The provision of safe vehicle trajectories based on both observable obstacles and virtual obstacles, associated hypothetical events and occurrence probabilities of each combination of obstacles and events, as above, provides for allowing vehicles to travel safely in environments where not all objects have already been observed.

According to an eleventh embodiment, the processor further is arranged to determine unobservable areas as at least one of: areas outside a sensing range of the vehicle sensors; areas for which the confidence of obtained sensor readings fall below a predetermined confidence threshold; and areas occluded by objects in the vehicle surrounding environment.

The provision of determining unobservable areas, as above, provides some efficient alternatives for this determination.

According to a twelfth embodiment, the processor further is arranged to determine safe vehicle trajectories such that, should a low-probability hypothetical event occur, a first margin is applied, and such that, should a high-probability hypothetical event occur, a second margin is applied, where the first margin is relatively smaller than the second margin.

The provision of using a first margin for low-probability hypothetical events and using a second margin for high-probability hypothetical events provides for efficient determination and adaptation of safe vehicle trajectories.

According to a thirteenth embodiment, the processor further is arranged to determine an environment category from a set of predetermined environment categories and select the one or more hypothetical events from a set of predetermined hypothetical events based on the determined environment category, and assign to virtual obstacles having different associated hypothetical events different probabilities to occur depending on the determined environment category.

The provision of determining an environment category from a set of predetermined environment categories and selecting the one or more hypothetical events from a set of predetermined hypothetical events based on the determined environment category, and assigning to virtual obstacles having different associated hypothetical events different probabilities to occur depending on the determined environment category provide for efficiently adapting to a current vehicle environment.

According to a fourteenth embodiment, the processor further is arranged to rely on statistic data for previous occurrences of observed obstacles associated with predetermined environment categories for determining probabilities for virtual obstacles to occur depending on the determined environment category.

The provision of using statistic data for determining probabilities for virtual obstacles to occur depending on the determined environment category provides for still further enhancing the safe vehicle trajectories in dependence of a current vehicle environment.

According to a final embodiment, a vehicle which comprises an arrangement for determining safe vehicle trajectories for a vehicle equipped with sensors for monitoring the surrounding environment, taking into account sensing limitations, as above.

A vehicle which comprises an arrangement for determining safe vehicle trajectories, as above, is able to travel safely in environments where not all objects have already been observed.

BRIEF DESCRIPTION OF THE DRAWINGS

In the following, embodiments herein will be described in greater detail by way of example only with reference to attached drawings, in which.

Figure 1A:
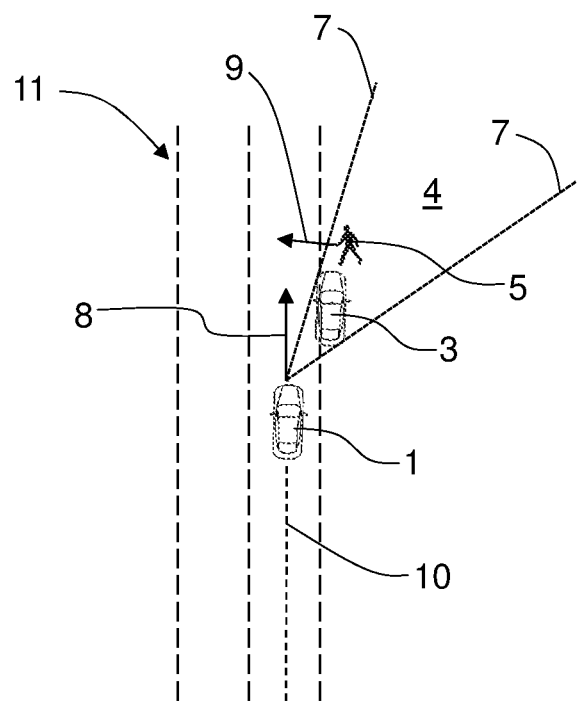
FIG. 1a-b is a schematic illustration of a first example of the behavior of a vehicle using an approach according to embodiments herein.

Still other objects and features of embodiments herein will become apparent from the following detailed description considered in conjunction with the accompanying drawings. It is to be understood, however, that the drawings are designed solely for purposes of illustration and not as a definition of the limits hereof, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

In overview embodiments herein relates to a method which determines safe vehicle trajectories for a vehicle 1 equipped with sensors 2 for monitoring the surrounding environment, taking into account sensing limitations, enabling the vehicle 1 to drive with precaution, where precaution is a measure taken in advance in order to prevent something dangerous, unpleasant or inconvenient from happening. Thus, safe vehicle 1 trajectories, as used herein mean trajectories allowing vehicle 1 occupants a reasonably safe and/or comfortable ride.

Examples of sensors 2 include but are not limited to one or more of a Radio Detection And Ranging (RADAR) sensor, a Light Detection And Ranging (LIDAR) sensor, a Light Amplification by Stimulated Emission of Radiation (LASER) sensor, a SOund NAvigation and Ranging (SONAR) sensor (e.g. ultrasound), an InfraRed (IR) sensor, an image sensor (e.g. camera), vehicle location devices (e.g. GPS) and any combinations thereof.

In its most general embodiment the method consists of the steps of: detecting observable obstacles 3; detecting unobservable areas 4; adding virtual obstacles 5 in unobservable areas 4; associating each observable obstacle 3 and each virtual obstacle 5 with one or more hypothetical events and assigning an occurrence probability to each combination of obstacle 3, 5 and events; and determining safe vehicle 1 trajectories based on both observable obstacles 3 and virtual obstacles 5 and the occurrence probability of each combination of obstacle 3, 5 and events.

The aim is to allow a vehicle 1 to travel safely with precaution in an environment where not all objects have already been observed, taking into account that that the sensors 2 have known limitations when it comes to detecting other road users. This is done by anticipating objects in all unobserved areas 4, such that should an object exist in an unobserved area 4 and possibly also perform a maneuver, such as move, there is provided a margin thereto by the determined safe vehicle 1 trajectories. Margins, as used herein may relate to safety margins but also to margins enabling travel past a situation in a more comfortable way for vehicle 1 occupants, i.e. either physical margins to an obstacle 3, 5 or margins in terms of vehicle 1 dynamics. Accordingly, hypotheses are developed for what could be concealed outside of the an observed area in which it is possible to detect obstacles 3 such that a safety or comfort system of the vehicle 1 is able to handle the situation should an hypothesis later prove to be true. These hypotheses are referred to herein as hypothetical events.

An observed area is defined as an area in the vehicle's surrounding environment in which all obstacles 3 have been detected by an obstacle detection system, e.g. vehicle 1 sensors 2. An unobserved area 4 is the opposite of an observable area, i.e. it may contain obstacles which have not yet been detected by the obstacle detection system 2. An unobserved area 4 may be for instance: an area outside a sensing range or field-of-view of vehicle 1 sensors 2, an occluded area, i.e. an area behind real objects 3 and therefore not observable, an area which is not observed with sufficient confidence, e.g. only visible to n−1 sensors 2 while functional safety requires n sensors 2, and an area where it may be difficult to ascertain individual objects, e.g. such as a person standing close to a roadside barrier of a post. Areas where it may be difficult to ascertain individual objects may be areas for which the confidence of obtained sensor 2 readings falls below a predetermined confidence threshold. Also, areas where it may be difficult to ascertain individual objects may be previously known, and if so e.g. stored in a map system associated with one or more vehicle systems, such that consideration thereof can be made. Thus, according to some embodiments, unobservable areas 4 are determined as at least one of: areas outside a sensing range of the vehicle 1 sensors 2; areas for which the confidence of obtained sensor 2 readings fall below a predetermined confidence threshold; and areas occluded by objects 3 in the vehicle 1 surrounding environment.

Obstacles 3, 5 may be objects, e.g. cars, pedestrians, but also other things which are not safe to drive into, such as holes in the ground.

In some embodiments virtual obstacles 5, the associated hypothetical events of which exceed a predetermined probability to occur, are added to the unobservable areas 4. In other embodiments, virtual obstacles 5 implying more conservative safe vehicle 1 trajectories are added to the unobservable areas 4. It should be noted that adding "more conservative" virtual obstacles 5, i.e. virtual obstacles 5 that implies a more conservative vehicle 1 trajectory, also generates a safe vehicle 1 trajectory for a larger set of potentially present obstacles. The generated safe vehicle 1 trajectories may comprise information enabling the vehicle 1 to adjust both its lateral and longitudinal travel in order to generate margins to the virtual obstacles 5.

After adding virtual obstacles 5, each observable obstacle 3 and each virtual obstacle 5 is associated with one or more hypothetical events and each combination of obstacle 3, 5 and events assigned an occurrence probability, whereupon a safe vehicle 1 trajectory, or set of trajectories, can be determined, based on both real, i.e. detected observable obstacles 3, and virtual obstacles 5 and the occurrence probability of each combination of obstacle 3, 5 and events. This determined safe vehicle 1 trajectory, or set of trajectories, may e.g. be used for: planning the path of a self-driving (autonomous) vehicle 1; planning the path of a semi-autonomous vehicle 1, e.g. controlling the vehicle 1 set speed of an ACC system; and informing a vehicle 1 driver, e.g. provide a safe speed recommendation.

It may also be used for evaluating, in quantifiable terms, how safe a vehicle 1 is operated. This, in turn, may e.g. be used as input to "Pay-as-you-drive" insurance policies.

In some embodiments, low-probability hypothetical events and high-probability hypothetical events are handled differently when planning safe trajectories. For a low-probability hypothetical event a vehicle 1 velocity might e.g. be reduced substantially whereas for a high-probability hypothetical event the velocity is only reduced to some extent. Thus, in such embodiments safe vehicle 1 trajectories are determined such that, should a low-probability hypothetical event occur, a first margin is applied, and such that, should a high-probability hypothetical event occur, a second margin is applied, where the first margin is relatively smaller than the second margin.

It is easily understood that any number of margins may be represented by these first and second margins, such that a specific margin is applied for any degree of probability of an associated hypothetical event. This also means that instead of a number of discrete margins, the margins may be provided from a continuous scale, e.g. such that a margin is provided from this continuous scale for any degree of probability, possibly also provided from a continuous scale.

In some embodiments virtual obstacles 5 will have models of motion associated to them, e.g. if a real obstacle 3 is determined as an obstacle vehicle 3 parked at the side of the road it is assumed that there might be a pedestrian obscured by the obstacle vehicle, thus a pedestrian model of motion is assigned to a virtual object 5 obscured by the obstacle vehicle 3. Thus, in such embodiments a virtual obstacle 5 is associated with a model of motion and an associated hypothetical event based on the virtual obstacles 5 possible motion from a current position given by its associated model of motion.

An automobile model may be used for the prediction of a behavior of an automobile virtual obstacle 5 and a human model for the prediction of a behavior of a human virtual obstacle 5, e.g. pedestrian. Further, a single-moving-body model such as a two-wheeled motor vehicle model and a bicycle model may also be used for virtual obstacles 5 as necessary.

Here, there will thus be a safety area around a virtual obstacle 5 delimited by the model of motion used for the associated hypothetical events associated with the virtual obstacle 5, e.g. it is assumed that a pedestrian will be located at the worst possible position within an unobserved area 4, such that the associated safety area is determined by an event including possible motion from that position given by the model of motion used. Should a pedestrian e.g. move into the lane, where it will be possible to detect that pedestrian using vehicle 1 sensors 2, information from the sensors 2 will be used for determining an appropriate velocity and course for a vehicle 1 trajectory avoiding a collision with that pedestrian, such that e.g. the velocity of travel of the vehicle 1 can be adjusted accordingly.

It will be evident to the person skilled in the art that the capacities of a braking system and steering system of the vehicle 1 will set boundaries for available maneuvers and trajectories. Thus, the capacities of the braking and steering systems of an associated vehicle 1 should be taken into consideration for determining safe vehicle 1 trajectories.

Determination of which model of motion to use for hypothetical events associated with a virtual obstacle 5 may be based on probabilities, e.g. based on the environment the vehicle 1 is currently in, i.e. the vehicle 1 surroundings, such that if for instance the vehicle 1 is travelling on a country road in a rural or forest rich environment the model of motion to use for the virtual obstacle 5 may be that of an animal, such as a moose or deer. If the vehicle 1 is travelling in a densely populated city environment or in a parking area the model of motion to use for the virtual obstacle 5 may be that of a pedestrian. When approaching or traversing an intersection the model of motion to use for the virtual obstacle 5 may be that of another vehicle, such as an automobile or bus, lorry. If the vehicle 1 is approaching or travelling a curved road section the model of motion to use for the virtual obstacle 5 may instead be that of a stationary vehicle, i.e. no motion.

Thus, in such embodiments an environment category is determined from a set of predetermined environment categories, e.g. as above, and the one or more hypothetical events selected from a set of predetermined hypothetical events based on the determined environment category.

Probabilities can also be assigned to the occurrence of a virtual obstacle 5 at a certain location performing a hypothetical event motion in accordance with the associated model of motion, e.g. such that if a high probability is assigned to an occurrence a large margin is provided, allowing for a smooth braking operation should it occur. Conversely, if a low probability is assigned to an occurrence, i.e. it is deemed unlikely to occur, the margin might be reduced, requiring hard braking of the vehicle 1 for avoidance should it occur. It is of course also possible to adapt the level of braking to the requirements of the particular situation, i.e. ranging from smooth comfortable braking to hard emergency braking and encompassing all degrees of braking in-between. This can be done through calculating how the own vehicle 1 should be placed laterally and at which speed it should travel as we pass an observable area in-front of the own vehicle 1 in order to be able to handle the situation adequately should an hypothesis represented by a virtual object 5 and its associated model of motion become reality, i.e. should one or more hypothetical events associated with a virtual object 5 occur.

It should be noted that the first and second margins, according to embodiments herein, are either physical margins to an obstacle 3, 5 or margins in terms of vehicle 1 dynamics. Physical margins to an obstacle 3, 5 are distances from a safe vehicle 1 trajectory to the obstacle 3, 5. Margins in terms of vehicle 1 dynamics are margins in one or more of vehicle 1 longitudinal-, lateral- and yaw-acceleration levels required for following a safe vehicle 1 trajectory. Furthermore, an increased physical margin to an obstacle 3, 5 means an increased distance from a safe vehicle 1 trajectory to the obstacle 3, 5 and a decreased physical margin to an obstacle 3, 5 mean a reduced distance from a safe vehicle 1 trajectory to the obstacle 3, 5. An increased margin in terms of vehicle 1 dynamics means reduced vehicle 1 acceleration levels required for following a safe vehicle 1 trajectory and a decreased margin in terms of vehicle 1 dynamics means increased vehicle 1 acceleration levels required for following a safe vehicle 1 trajectory.

The connection between acceleration levels and the comfort of vehicle 1 occupants is easily understood, e.g. will a low acceleration level, such as 2 m/s² provide high comfort, i.e. a large margin, a medium acceleration level of 5 m/s² provide less comfort, i.e. a smaller margin, and a high acceleration level of 8 m/s² provide low comfort, i.e. a small margin. Comfort, as used herein, may be expressed in terms of longitudinal-, lateral- and yaw-maneuvers of the vehicle 1. For certain hypothetical events it may be desirable to determine safe vehicle 1 trajectories such that it is possible to handle a hypothetical event by smooth and comfortable braking, should it occur. For other hypothetical events it may be desirable to determine safe vehicle 1 trajectories such that it is possible to handle a hypothetical event by a smooth and comfortable steering maneuver. Maneuvers where safe vehicle 1 trajectories result in a requirement to accelerate the vehicle 1 in order to avoid an accident are also feasible, e.g. in intersections. It is of course also possible to determine safe vehicle 1 trajectories requiring the vehicle 1 to perform combinations of one or more of steering-, braking-, and accelerating-maneuvers in order to avoid an accident.

A person skilled in the art will have no difficulties in performing conversions between the different types of margins.

Thus safe vehicle 1 trajectories are generated with margins such that e.g. when driving in a parking lot it is possible to stop for a real pedestrian by smooth and comfortable braking should a virtual pedestrian 5 later turn out to be real. For less likely events, such as e.g. a pedestrian emerging from a vehicle that has been static adjacent a road for days, safe vehicle 1 trajectories may be planned with margins enabling emergency braking in order to handle the situation should it occur. In this way it becomes possible to allow the vehicle 1 to e.g. travel at higher speed in environments where the hypothetical events considered are unlikely to occur and at lower speed in environments where the hypothetical events considered are more likely to occur.

Similarly, it might be desirable to perform smooth and comfortable braking should a virtual pedestrian 5 walk out into an intersection and at the same time be able to perform emergency braking for the same virtual pedestrian 5, should the latter run out into the intersection as the assigned probability for this second hypothetical event normally will be substantially lower than for the first hypothetical event. Thus, the safe vehicle trajectories will be determined in a way that can handle both the first and the second hypothetical events, which in practical terms means that the velocity of the vehicle 1 should be reduced to a level where the demands of both hypothetical events are fulfilled. This may be realized in at least two ways, either through introducing larger (longitudinal) physical margins around the walking virtual pedestrian 5, or by calculating backwards to which speed the vehicle 1 is required to maintain in order to be able to perform smooth and comfortable braking to avoid the walking virtual pedestrian 5. For the running virtual pedestrian 5 it is possible to introducing smaller (longitudinal) physical margins or to calculate backwards to which speed the vehicle 1 is required to maintain in order to be able to perform emergency braking for the running virtual pedestrian 5.

Thus, in such embodiments, virtual obstacles 5 having different associated hypothetical events are assigned different probabilities to occur depending on the determined environment category when determining safe vehicle 1 trajectories.

Thus, as described above, in some embodiments an environment category is determined from a set of predetermined environment categories and the one or more hypothetical events selected from a set of predetermined hypothetical events based on the determined environment category, and virtual obstacles 5 having different associated hypothetical events are assigned different probabilities to occur depending on the determined environment category.

The comfort of vehicle 1 occupants and e.g. the anticipated frequency of occurrences can be used in order to determine which margin should be employed. According to some embodiments, statistic data for previous occurrences of observed obstacles 3 associated with predetermined environment categories is relied on for determining probabilities for virtual obstacles 5 to occur depending on the determined environment category. It should be noted that although based on statistic data it is suggested to restrict which hypothetical events that are likely to occur. Hypothetical events that are extremely unlikely to occur should not be included as such events would make it impossible to find any safe vehicle 1 trajectory, which of course would not be desirable. However, it is suggested to anticipate hypothetical events such as e.g. a pedestrian appearing from behind vehicle which is parked along the roadside. This may, as also described above, be done by placing a virtual pedestrian 5 behind the parked vehicle, or even in front thereof should the sensors 2 experience difficulties in ascertaining a pedestrian close to a vehicle, and predicting that the virtual pedestrian 5 may enter the road in front of the own vehicle 1. Thus, worst-case predictions based on extremely unlikely hypothetical events are not made but accounted for are hypothetical events which reasonably, i.e. within reasonable limits, are probable to occur. It is of course appropriate to also attempt to handle very improbable hypothetical events should such occur.

When relying on probabilities it is also possible to have a safety system of the vehicle 1 handle more unusual hypothetical events, i.e. of low-probability, and a vehicle 1 comfort system handle more probable hypothetical events. An example safety system of the vehicle 1 for handling more unusual events could be an emergency braking or collision avoidance system, and an example vehicle 1 comfort system could be a driver assist system such as a lane keeping assist system. Each unobservable area 4 may result in the generation of a number of virtual objects 5, each of which may be associated with one or more hypothetical events assigned different probabilities to occur, thus being considered in order to be handled with different levels of comfort.

It will be realized by the person skilled in the art that it is possible to create any number of different models and probabilities for any number of environments and assign suitable assumptions regarding virtual obstacles 5 and associated hypothetical events thereto, in order to evolve and develop the method and arrangement described herein. For example, it would be possible to list a number of hypothetical events without assigning any occurrence probability for the respective events, i.e. such a listing would only comprise such hypothetical events that are deemed relevant to handle by a certain type of vehicle maneuver for determining safe vehicle 1 trajectories. However, as will be easily understood, in practice this means that all of the thus listed hypothetical events are in fact assigned a 100% probability to occur. Similarly it will also be possible to provide several such listings, e.g. a first list of hypothetical events that can be handled by comfortable vehicle maneuvers should these events occur, and a second list of hypothetical events which can be handled by harsher maneuvers should these events occur, and a third list of hypothetical events that requires emergency maneuvers, e.g. emergency braking, should these events occur.

For illustrating the proposed method consider the following example scenarios. If the vehicle 1 travels past a school or a school bus safe vehicle 1 trajectories will be determined through detecting unobservable areas 4 and placing virtual children 5 in these unobservable areas 4. These virtual children 5 will then be associated with the hypothetical events of walking out into the road travelled by the vehicle 1 and a high occurrence probability assigned thereto. Safe vehicle 1 trajectories are determined such that it will be possible to avoid a collision with a child using a smooth and comfortable maneuver should it later turn out that there was a child in the unobservable area 4 and that child in fact walked out into the road travelled by the vehicle 1. In practice this will mean that a safe vehicle 1 trajectory will be determined such that the vehicle 1 will be laterally placed on the road such that a child can be detected as early as possible and which means that the vehicle 1 velocity will be reduced to a level where it will be possible to perform smooth and comfortable braking should a virtual child 5 turn out to exist for real. Upon calculating which velocity and lateral placement should be used it is envisaged to take into account the capacity of the sensors 2 in terms of field-of-view and detection times, as well as limitations in vehicle actuators for performing braking-acceleration- and steering-maneuvers in order to model a smooth and comfortable maneuver. In practice, for the above scenario, this may mean that a safe vehicle 1 trajectory will displace the vehicle 1 e.g. 0.5 m laterally towards a center of the road, if there is no other traffic to be considered, and that the velocity of the vehicle 1 is limited to e.g. 30 km/h.

Correspondingly, if the vehicle 1 travels on a rural road through a village, there is also a probability that someone will walk out into the road, but the probability therefor may be considered to be lower than when passing a school, as above. Assuming that the probability is lower, a safe vehicle 1 trajectory is determined that implies maneuvers allowing the vehicle 1 to avoid a collision using a medium-harsh braking/steering maneuver should it turn out that someone walks out into the road. In practical terms this may mean that a safe vehicle 1 trajectory is determined requiring the vehicle velocity to be reduced to e.g. 50 km/h.

Furthermore, if the vehicle 1 travels past a vehicle parked along an expressway, which vehicle has recently stopped at the roadside, there is a probability, although low, that someone will walk out behind the parked vehicle and traverse the road. A safe vehicle 1 trajectory is determined such that the vehicle 1 is able to handle this hypothetical event using a harsh braking/steering maneuver. In practical terms this may mean that a safe vehicle 1 trajectory is determined requiring the vehicle velocity to be reduced to e.g. 70 km/h, allowing the vehicle to handle this hypothetical event using the harsh braking/steering maneuver should this event later occur. However, should the parked vehicle still be there three days later as the vehicle 1 travels past it again, the probability that someone will walk out behind the parked vehicle and traverse the road has fallen considerably. In this case a safe vehicle 1 trajectory is determined such that the vehicle 1 is able to handle this hypothetical event using an emergency maneuver, e.g. emergency braking, should this event later occur. In practical terms this may mean that a safe vehicle 1 trajectory is determined requiring the vehicle velocity to be reduced to e.g. 90 km/h, allowing the vehicle to handle this hypothetical event using an emergency harsh braking/steering maneuver should this event later occur.

Thus, as illustrated above, for similar situations the safe vehicle 1 trajectories are determined slightly different. In environments where the probability is high that someone will enter the road, safe vehicle trajectories are planned with large margins, e.g. in terms of requiring the velocity of the vehicle to be reduced to a level where it will be possible to handle hypothetical events in a comfortable way, and in other environments, where the probability is low for the same type of hypothetical event, safe vehicle trajectories are planned with smaller margins, such that it will be possible to handle hypothetical events with more harsh maneuvers should the event later occur.

Figure 4:
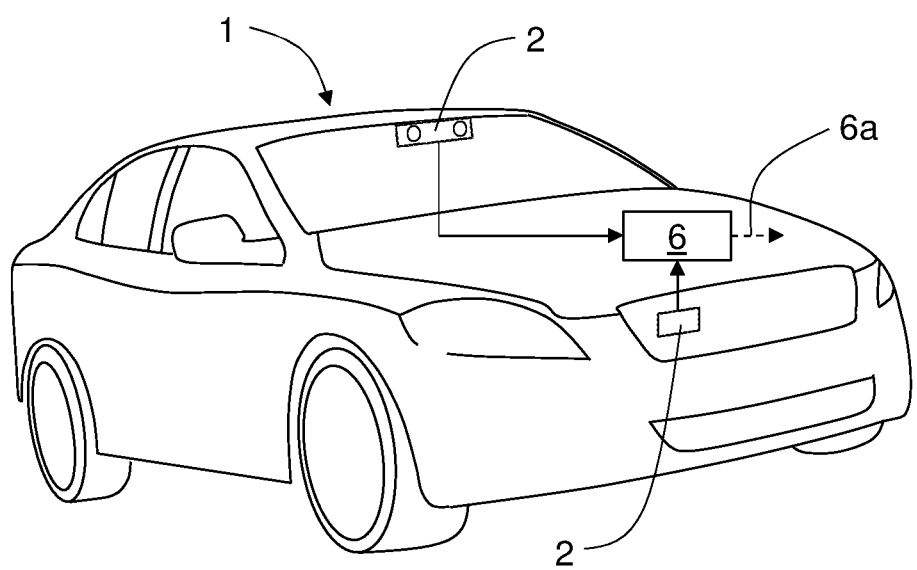
FIG. 4 is a schematic illustration of an arrangement for determining safe vehicle trajectories for a vehicle equipped with sensors for monitoring the surrounding environment, taking into account sensing limitations.

Further embodiments herein, as illustrated in FIG. 4, relates to an arrangement for determining safe vehicle trajectories for a vehicle 1 equipped with sensors 2 for monitoring the surrounding environment, taking into account sensing limitations. The arrangement comprises: a processor 6 arranged to process readings from the vehicle 1 sensors 2 for monitoring the surrounding environment and: detect observable obstacles 3; detect unobservable areas 4; add virtual obstacles 5 in unobservable areas 4; associate each observable obstacle 3 and each virtual obstacle 5 with one or more hypothetical events and assign an occurrence probability to each combination of obstacle 3, 5 and events; and determine safe vehicle 1 trajectories, illustrated by dashed arrow 6a, based on both observable obstacles 3 and virtual obstacles 5 and the occurrence probability of each combination of obstacle 3, 5 and events. The safe vehicle 1 trajectories 6a are then provided to other vehicle 1 systems (not shown), such as e.g. driver assist, driver warning or autonomous or semi-autonomous vehicle 1 drive control systems. The processor 6 may be an integral part of such other vehicle 1 systems.

In some embodiments more than one processor 6 may be used. In such embodiments the arrangement may comprise a large number of processors 6. The processor or processors 6 may be central processing units, CPUs, and associated memory which stores and carry out instructions of computer programs/software which when executed execute basic arithmetical, logical, and input/output operations for performing the operations and functions described herein. The processors 6 may also comprise one or more accelerated processing units, APUs, also referred to as advanced processing units, and associated memory. An APU is a processing unit that includes additional processing capability designed to accelerate one or more types of computations outside of a CPU.

The one or more processors may comprise microprocessors, microcontrollers, programmable digital signal processors, or other programmable devices, and may also, or instead, include an application specific integrated circuit (ASIC), a programmable gate array or programmable array logic, a programmable logic device, or a digital signal processor (DSP). A programmable device such as a microprocessor, microcontroller or programmable digital signal processor, may further include a memory or storage for storing computer executable instructions (e.g., code) that are executable by the programmable device for controlling operation thereof and for performing the particular algorithms represented by the functions and/or operations described herein.

In some embodiments, the processor 6 is further arranged to determine unobservable areas 4 as at least one of: areas outside a sensing range of the vehicle 1 sensors 2; areas for which the confidence of obtained sensor 2 readings fall below a predetermined confidence threshold; and areas occluded by objects 3 in the vehicle 1 surrounding environment.

According to some further embodiments, the processor 6 is further arranged to determine safe vehicle 1 trajectories such that, should a low-probability hypothetical event occur, a first margin is applied, and such that, should a high-probability hypothetical event occur, a second margin is applied, where the first margin is relatively smaller than the second margin.

In yet further embodiments, the processor 6 further is arranged to determine an environment category from a set of predetermined environment categories and select the one or more hypothetical events from a set of predetermined hypothetical events based on the determined environment category, and assign to virtual obstacles 5 having different associated hypothetical events different probabilities to occur depending on the determined environment category.

According to still further embodiments, the processor 6 further is arranged to rely on statistic data for previous occurrences of observed obstacles 3 associated with predetermined environment categories for determining probabilities for virtual obstacles 5 to occur depending on the determined environment category.

In accordance with the present disclosure is also envisaged a vehicle 1 equipped with sensors 2 for monitoring the surrounding environment comprising an arrangement as described in the foregoing.

A vehicle 1 which comprises an arrangement, as above, may range from a fully autonomous vehicle 1 to a driver controlled vehicle 1 where the sensor information is only used to inform the driver.

In the following will be illustrated, through some further examples, the behavior of a vehicle 1 using the proposed approach. As described above, the method and arrangement may be used for e.g.: estimating a safe velocity for the host vehicle 1 in any given situation; and adjusting the future path of the host vehicle 1 making it possible to e.g. to optimize (maximize) travel parameters, such as host vehicle 1 velocity.

Figure 1B:
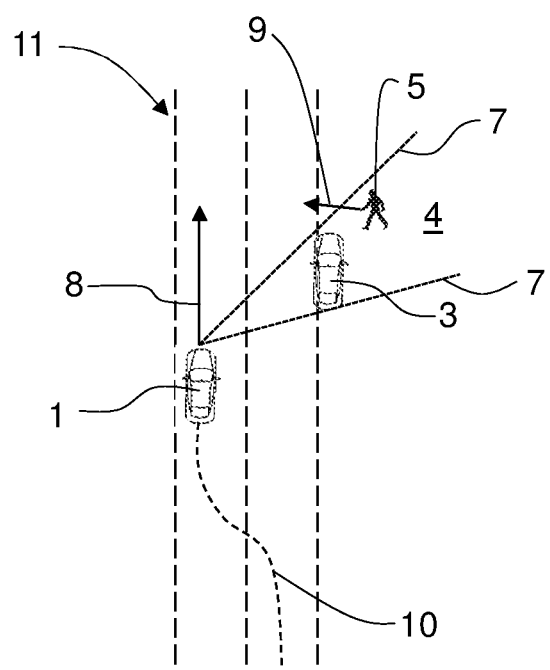

The first example, as illustrated in FIGS. 1a and 1b, illustrates changing or not changing lanes when driving past a roadside object 3.

FIG. 1a Shows a host vehicle 1 driving on a road 11 with a small lateral distance to a stationary roadside obstacle vehicle 3. The dotted lines 7 illustrate the boundaries of the sensor 2 capabilities when occluded by an observable obstacle 3, such that an unobservable area 4 is formed behind the observable obstacle 3. A virtual obstacle 5, e.g. a pedestrian, is added in the unobserved area 4 behind the stationary roadside obstacle vehicle 3. The host vehicle 1 velocity, illustrated by arrow 8, is limited to ensure that there will be no collision with the virtual obstacle 5 should it move in accordance with an associated hypothetical event, as illustrated by arrow 9, into the path of the host vehicle 1 illustrated by the dashed line 10.

FIG. 1b Shows how the host vehicle 1 performs a lane change, as illustrated by the dashed line 10, to reduce the relative size of the unobserved area 4 in the direction of travel. The virtual obstacle 5 is now farther away and the host vehicle 1 may increase its velocity, illustrated by arrow 8, while maintaining a sufficiently low risk of collision even if the virtual obstacle 5 should move in accordance with an associated hypothetical event, as illustrated by arrow 9, onto the road 11.

Figure 2A:
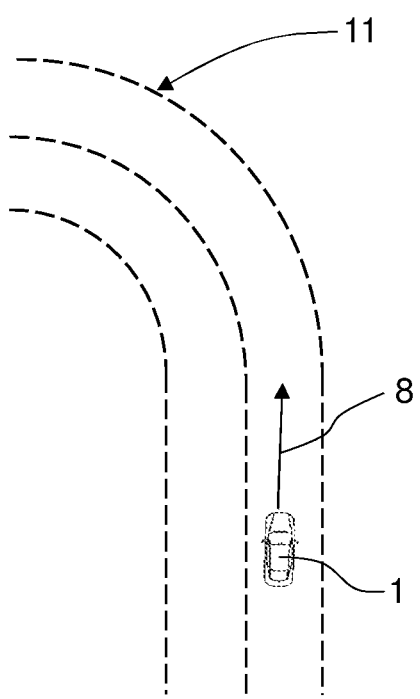
FIG. 2a-c is a schematic illustration of a second example of the behavior of a vehicle using an approach according to embodiments herein.
Figure 2B:
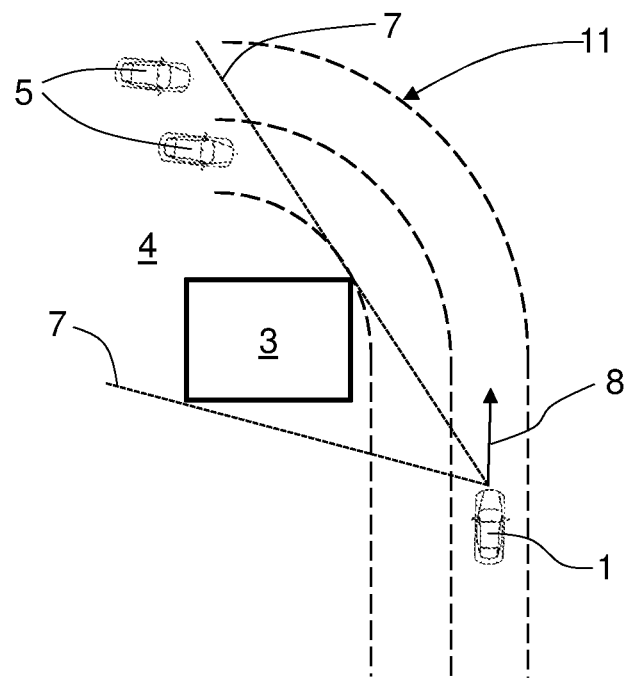
Figure 2C:
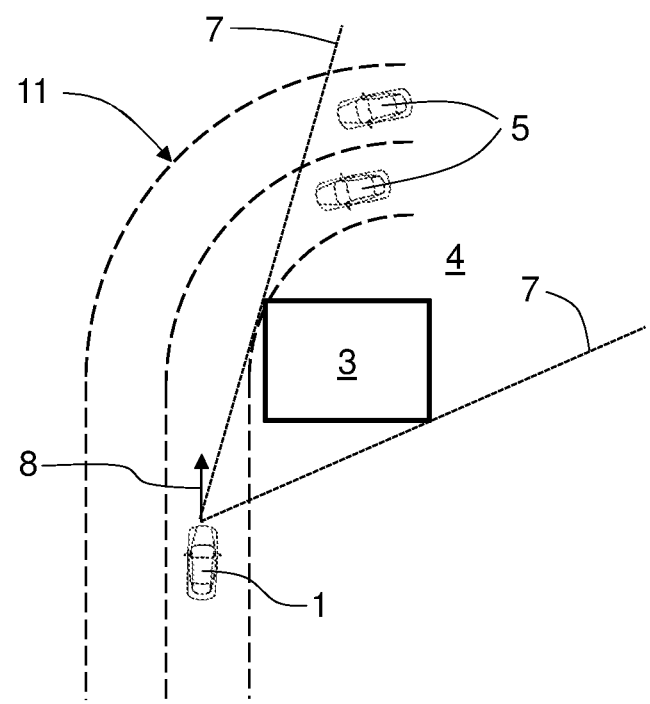

The second example, as illustrated in FIGS. 2a, 2b and 2c, illustrates the host vehicle 1 driving in road 11 curve with or without a blocked view.

FIG. 2a Shows how a host vehicle 1 drives towards a road 11 curve with a velocity, illustrated by arrow 8, based e.g. on the road 11 curve radius.

FIG. 2b Shows how the host vehicle 1 view is blocked by an object 3, creating an unobserved area 4. Virtual obstacles 5, with associated hypothetical event e.g. as oncoming obstacle vehicles 5, are added in the unobserved area 4. The host vehicle 1 velocity, illustrated by arrow 8, is limited to ensure that there is no collision with the virtual obstacles 5.

FIG. 2c Illustrates the same situation as illustrated in FIG. 2b, except for the road 11 curve direction. The host vehicle 1 velocity, illustrated by arrow 8, is limited even more than in the FIG. 2b scenario since the virtual obstacles 5 now are closer to the host vehicle 1.

Figure 3A:
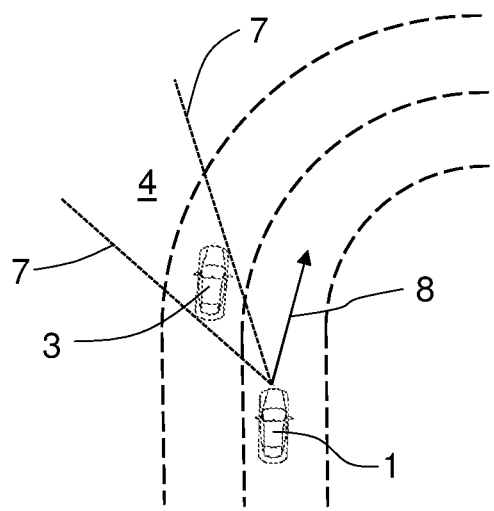
FIG. 3a-b is a schematic illustration of a third example of the behavior of a vehicle using an approach according to embodiments herein.
Figure 3B:
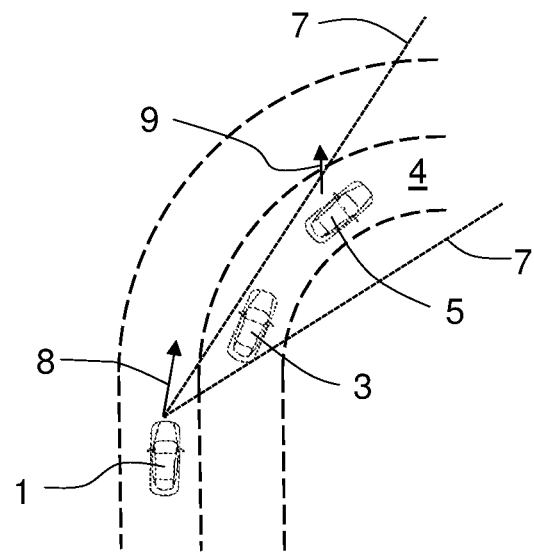

The third example, as illustrated in FIGS. 3a and 3b, illustrates a host vehicle 1 overtaking an obstacle vehicle 3 while driving in a road 11 curve.

FIG. 3a Shows how the host vehicle 1 overtakes an obstacle vehicle 3 in a road 11 curve with a velocity, illustrated by arrow 8, based e.g. on road 11 curve radius. No virtual obstacle, e.g. obstacle vehicle, needs to be placed in the unobserved area 4.

FIG. 3b Shows the same situation except that host vehicle 1 now drives in a left hand lane of the road 11. A virtual obstacle 5, e.g. obstacle vehicle 5, is here added in the unobserved area 4. The host vehicle 1 velocity, illustrated by arrow 8, is limited to ensure that there is no collision with the virtual obstacle 5, should it e.g. move in accordance with an associated hypothetical event, as illustrated by arrow 9, into the left lane of the road 11.

The above-described embodiments may be varied within the scope of the following claims.

Thus, while there have been shown and described and pointed out fundamental novel features of the embodiments herein, it will be understood that various omissions and substitutions and changes in the form and details of the devices illustrated, and in their operation, may be made by those skilled in the art. For example, it is expressly intended that all combinations of those elements and/or method steps which perform substantially the same function in substantially the same way to achieve the same results are equivalent. Moreover, it should be recognized that structures and/or elements and/or method steps shown and/or described in connection with any disclosed form or embodiment herein may be incorporated in any other disclosed or described or suggested form or embodiment as a general matter of design choice.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure.

Additionally, the features of various implementing embodiments may be combined to form further embodiments of the disclosure.

What is claimed is:

1. A method for determining safe vehicle trajectories for a vehicle equipped with sensors for monitoring a surrounding environment, taking into account sensing limitations, the method comprising:
   detecting observable obstacles using one or more of the sensors;
   determining, using a processor, unobservable areas;
   adding, using the processor, virtual obstacles in unobservable areas;
   associating, using the processor, each observable obstacle and each virtual obstacle with one or more hypotheses for objects concealed outside of an observed area in which obstacle detection is possible, referred to as hypothetical events, and assigning an occurrence probability to each combination of obstacle and one or more events; and
   determining, using the processor, safe vehicle trajectories based on both observable obstacles and virtual obstacles and the occurrence probability of each combination of obstacle and one or more events such that, should a first-probability hypothetical event occur, a first margin is applied to the determined safe vehicle trajectories, and should a second-probability hypothetical event occur, a second margin is applied to the determined safe vehicle trajectories, where the first-probability is less than the second-probability and the first margin is smaller than the second margin.

2. The method according to claim 1 wherein unobservable areas are determined as at least one of:
   areas outside a sensing range of the vehicle sensors;
   areas for which the confidence of obtained sensor readings falls below a predetermined confidence threshold; and
   areas occluded by objects in the vehicle surrounding environment.

3. The method according to claim 1 wherein virtual obstacles, the associated hypothetical events of which exceed a predetermined probability to occur, are added to the unobservable areas.

4. The method according to claim 1 wherein an environment category is determined from a set of predetermined environment categories and the one or more hypothetical events selected from a set of predetermined hypothetical events based on the determined environment category, and virtual obstacles having different associated hypothetical events are assigned different probabilities to occur depending on the determined environment category.

5. The method according to claim 4 wherein statistic data for previous occurrences of observed obstacles associated with predetermined environment categories is relied on for determining probabilities for virtual obstacles to occur depending on the determined environment category.

6. The method according claim 1, wherein the first and second margins are either physical margins to the obstacle or margins in terms of vehicle dynamics.

7. The method according to claim 6 wherein physical margins to an obstacle are distances from a safe vehicle trajectory to the obstacle, and margins in terms of vehicle dynamics are margins in one or more vehicle longitudinal-, lateral- and yaw-acceleration levels required for following a safe vehicle trajectory.

8. The method according to claim 7 wherein an increased physical margin to an obstacle means an increased distance from a safe vehicle trajectory to the obstacle and a decreased physical margin to an obstacle mean a reduced distance from a safe vehicle trajectory to the obstacle, and an increased margin in terms of vehicle dynamics means reduced vehicle acceleration levels required for following a safe vehicle trajectory and a decreased margin in terms of vehicle dynamics means increased vehicle acceleration levels required for following a safe vehicle trajectory.

9. A system for determining safe vehicle trajectories for a vehicle equipped with sensors for monitoring a surrounding environment, taking into account sensing limitations, the system comprising:
   a processor configured to process readings from the vehicle sensors for monitoring the surrounding environment, detect observable obstacles, determine unobservable areas, add virtual obstacles in unobservable areas, associate each observable obstacle and each virtual obstacle with one or more hypotheses for objects concealed outside of an observed area in which obstacle detection is possible, referred to as hypothetical events, and assign an occurrence probability to each combination of obstacle and one or more events, and determine safe vehicle trajectories based on both observable obstacles and virtual obstacles and the occurrence probability of each combination of obstacle and one or more events such that, should a first-probability hypothetical event occur, a first margin is applied to the determined safe vehicle trajectories, and should a second-probability hypothetical event occur, a second margin is applied to the determined safe vehicle trajectories, where the first-probability is less than the second-probability and the first margin is less than the second margin.

10. The system of claim 9 wherein the processor further is configured to determine unobservable areas as at least one of:
    areas outside a sensing range of the vehicle sensors;
    areas for which the confidence of obtained sensor readings fall below a predetermined confidence threshold; and
    areas occluded by objects in the vehicle surrounding environment.

11. The system of claim 9 wherein the processor further is configured to determine an environment category from a set of predetermined environment categories and select the one or more hypothetical events from a set of predetermined hypothetical events based on the determined environment category, and assign to virtual obstacles having different associated hypothetical events different probabilities to occur depending on the determined environment category.

12. The system of claim 11 wherein the processor further is configured to rely on statistic data for previous occurrences of observed obstacles associated with predetermined environment categories for determining probabilities for virtual obstacles to occur depending on the determined environment category.

13. A vehicle comprising:
    sensors for monitoring a surrounding environment; and
    a system for determining safe vehicle trajectories for the vehicle, taking into account sensing limitations, the system comprising a processor configured to process readings from the vehicle sensors for monitoring the surrounding environment, detect observable obstacles, determine unobservable areas, add virtual obstacles in unobservable areas, associate each observable obstacle and each virtual obstacle with one or more hypotheses for objects concealed outside of an observed area in which obstacle detection is possible, referred to as hypothetical events, and assign an occurrence probability to each combination of obstacle and one or more events, and determine safe vehicle trajectories based on both observable obstacles and virtual obstacles and the occurrence probability of each combination of obstacle and one or more events such that, should a first-probability hypothetical event occur, a first margin is applied to the determined safe vehicle trajectories, and should a second-probability hypothetical event occur, a second margin is applied to the determined safe vehicle trajectories, where the first-probability is less than the second-probability and the first margin is less than the second margin.

14. The method according to claim 1 wherein the vehicle is at least a semi-autonomous vehicle, and the method further comprises controlling the vehicle or outputting information to a vehicle driver based on the safe vehicle trajectories determined.

15. The system of claim 9 wherein the vehicle is at least a semi-autonomous vehicle, and the safe vehicle trajectories determined are used to control the vehicle or output information to a vehicle driver.

* * * * *